United States Patent

[11] 3,628,810

| [72] | Inventor | Kurt Graef<br>Cologne, Germany |
|---|---|---|
| [21] | Appl. No. | 64,108 |
| [22] | Filed | July 29, 1970 |
| [45] | Patented | Dec. 21, 1971 |
| [73] | Assignee | Ford Motor Company<br>Dearborn, Mich.<br>Continuation of application Ser. No.<br>762,002, Sept. 24, 1968, now abandoned.<br>This application July 29, 1970, Ser. No.<br>64,108 |

[54] LEVEL ADJUSTMENT FOR MOTOR VEHICLES
13 Claims, 4 Drawing Figs.

[52] U.S. Cl. .................................................. 280/124, 267/34
[51] Int. Cl. .................................................. B60g 3/00

[50] Field of Search .................................... 280/124 F; 267/34

[56]                      References Cited
               UNITED STATES PATENTS
3,212,768  10/1965  Casimir ........................ 267/34
3,331,599   7/1967  Polhemus ...................... 267/34

*Primary Examiner*—Philip Goodman
*Attorneys*—John R. Faulkner and Clifford L. Sadler ABSTRACT: A leveling system for maintaining a motor vehicle body at an established height above the ground including a shock absorber with a concentric coil spring. An annular spring seat engages one end of the coil spring and is slidable on the shock absorber. The seat also forms a part of an expansible chamber that may be pressurized to increase the load on the coil spring and compensate for a change in vehicle loading.

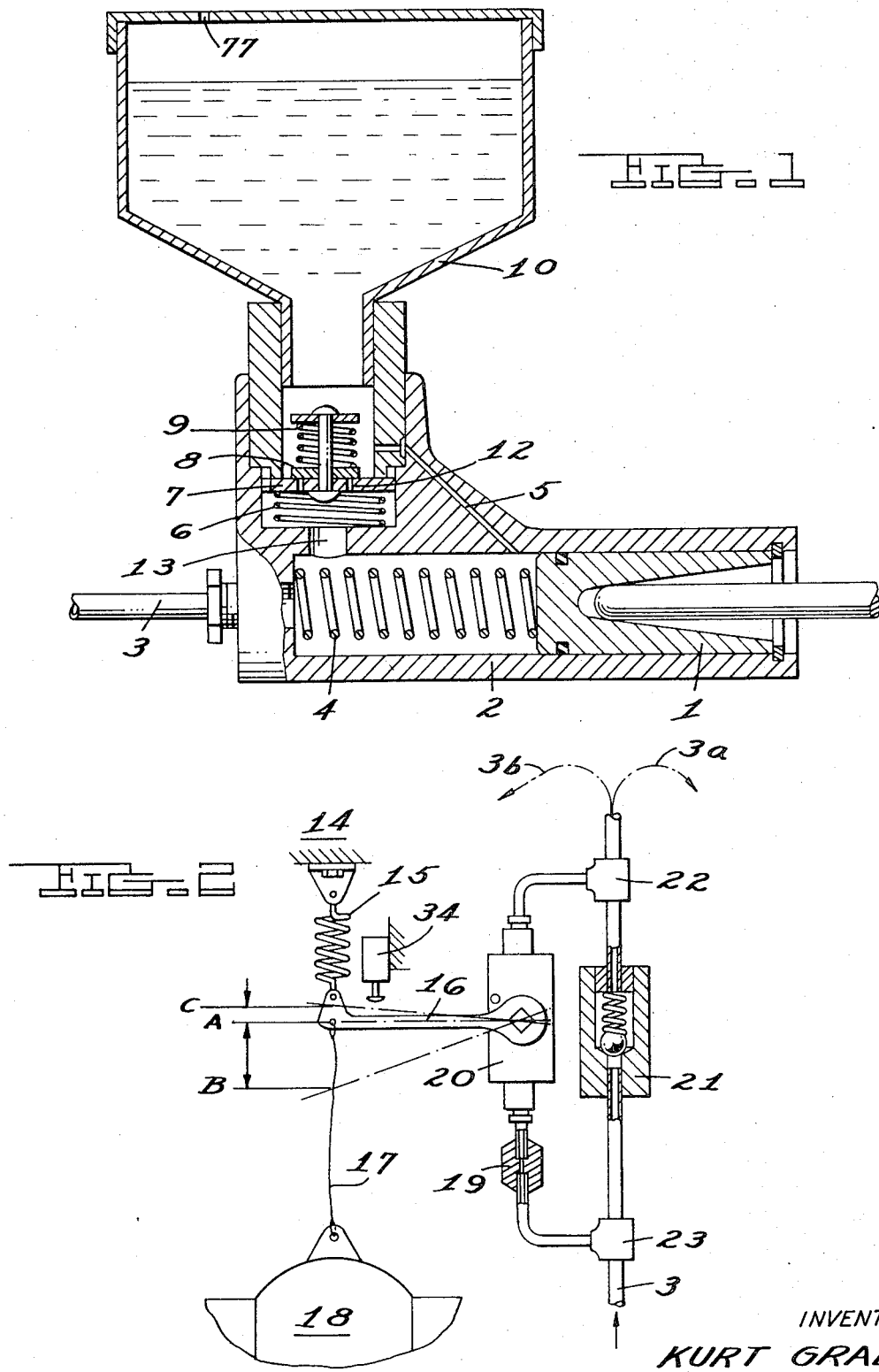

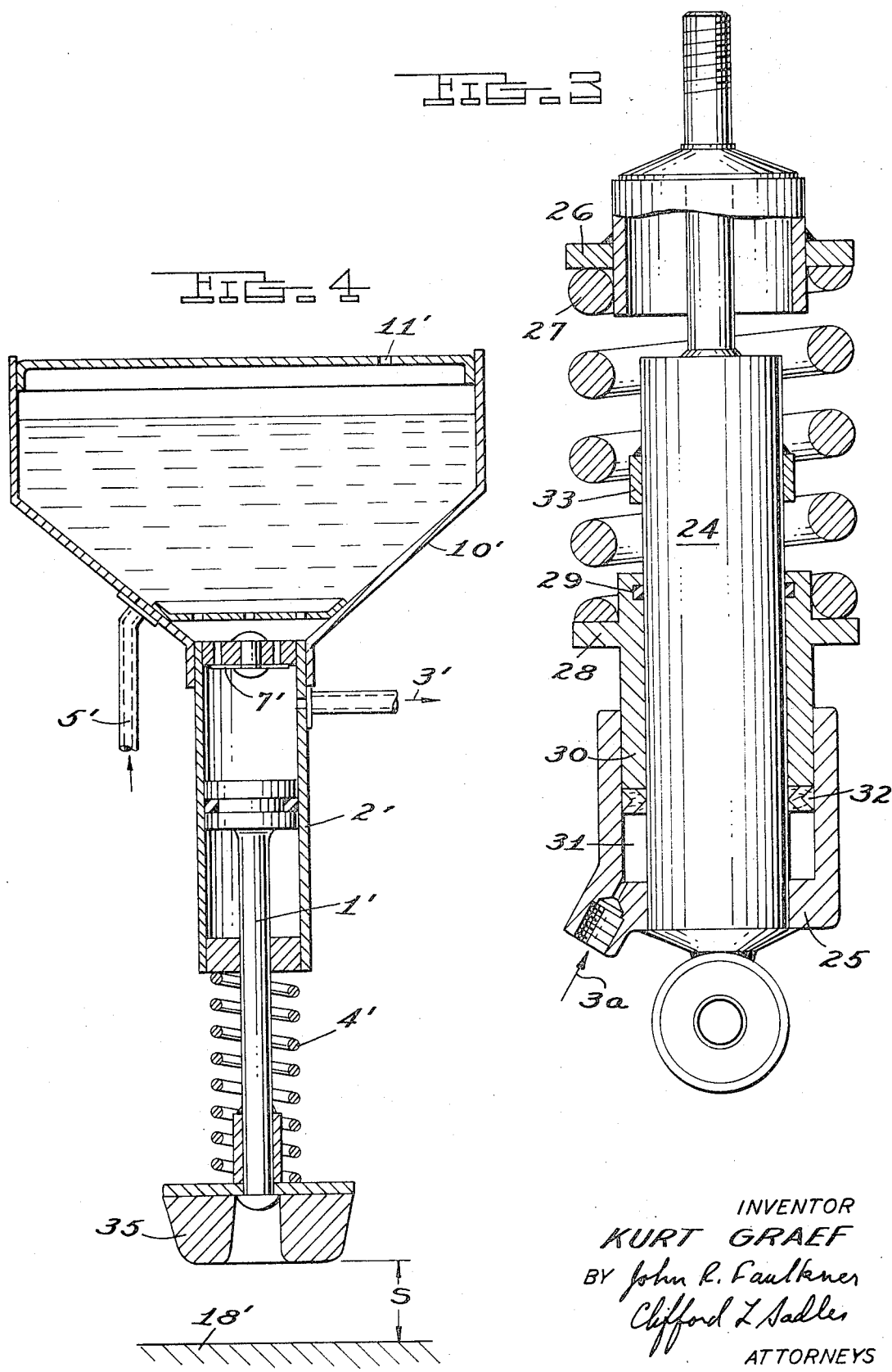

LEVEL ADJUSTMENT FOR MOTOR VEHICLES

This application is a continuation of Ser. No. 762,002 filed Sept. 24, 1968 now abandoned.

BACKGROUND OF THE INVENTION

The present invention relates to a level or riding height adjustment for motor vehicle suspension systems in which the suspension unit consists of a shock absorber and a concentric coil spring.

A level or ride height adjustment for motor vehicles with a hydraulic suspension unit is known in the art from German published Pat. application No. 1,154,359. The cylinder of the shock absorber of such a unit contains a suspension piston which is connected to the wheel suspension in addition to the standard shock absorber piston connected to the chassis.

The cylinder to the shock absorber is connected to the chassis of the motor vehicle by a spring element, such as a concentric coil spring. Level adjustment can be affected in this construction by an appropriate change in the shock absorber charge or pressure by a pump provided in the vehicle and by automatic or manually controlled regulating equipment.

A suspension unit of this type has the disadvantage that the seal of the suspension piston in the cylinder of the shock absorber is dynamically highly stressed due to the high-alternating pressures occurring in the working or pressure chambers of the shock absorber. Sealing at this point consequently is difficult and expensive and is subject to excessive wear.

German published Pat. application No. 1,091,881 describes a level adjustment for motor vehicles in which the pressurized fluid required for a leveling unit is supplied by a hydraulic pump which is constantly actuated by the jounce and rebound movement of the vehicle. This type of level adjustment mechanism has the disadvantage that the hydraulic pump actuated by the movement of the vehicle suspension constantly oscillates about its center position whereby undesirable high wear occurs in that area.

It is the aim of the present invention to eliminate the disadvantages of the known level adjustment mechanisms and to provide a leveling system that is simple, inexpensive and reliable, and which furthermore has the advantage that it can be subsequently installed as a unit in a motor vehicle equipped with standard hydraulic shock absorbers.

BRIEF DESCRIPTION OF THE DISCLOSURE

In accordance with the present invention, a height adjustment device for a motor vehicle is provided by a unique combination having the following characteristics:

a. A coil spring seat is secured to the piston rod of a telescopic shock absorber while a cylindrical sleeve is secured to the lower end of the cylinder part of the shock absorber. The sleeve forms part of an annular pressure chamber and slidably receives a cylindrical piston having a portion providing a second spring seat.

b. The annular pressure chamber formed between the cylindrical sleeve and the cylindrical piston can be charged with a pressurized fluid by a hydraulic pump which is actuated only upon demand.

c. The line leading from the hydraulic pump to the annular pressure chamber contains a valve which blocks return flow through the line when the vehicle is at its correct height and which opens the line after a load is removed from the vehicle until the normal level is again reached.

The hydraulic pump may consist of a simple pump actuated by hand or foot pressure by the driver when a need indicated by a signal from the control valve or it can be an automatic pump actuated by suspension movement of the vehicle. In the automatic pump, the piston is equipped with an elastic rubber buffer which is spaced at a certain distance from the axle when the vehicle is at its normal or designed level, so that the pump is only actuated by a demand indicated by the lowering of the vehicle body and the rubber buffer coming into contact with the axle.

The control valve assembly consists of a simple check valve blocking the return flow installed in the line from the hydraulic pump to the equalizing annular pressure chamber and of a shutoff valve arranged in a line parallel to the check valve. The shutoff valve has a lever arm that is connected by a spring to the chassis and by a cable to the axle. The shutoff valve is actuated according to the load on the motor vehicle.

BRIEF DESCRIPTION OF THE DRAWINGS

The details of the preferred embodiments of the present invention will be explained with reference to the accompanying drawings in which:

FIG. 1 is an elevational view, partly in section, of a hydraulic pump which can be utilized for a level adjustment system according to the invention, FIG. 2 is a schematic representation of a control valve assembly which can be utilized for a level adjustment system according to the invention;

FIG. 3 is an elevational view of a combination shock absorber, coil spring and height adjustment device constructed in accordance with the present invention; and FIG. 4 is a schematic representation of an automatic hydraulic pump which can be used in a level adjustment system according to the invention.

DETAILED DESCRIPTION OF THE PREFERRED EMBODIMENTS

FIG. 1 shows a hydraulic pump, the piston 1 of which is actuated in the cylinder 2 by the driver by hand or foot pressure. A pressure line 3 is constructed to carry the pressurized fluid displaced by piston 1 to the control valve assembly of FIG. 2 and the height adjustment device of FIG. 3. Piston 1 is returned to its initial position by a compression spring 4. A return flow bore 5 allows the pressurized fluid to return to the reservoir 10 during lowering of the height adjustment device. The reservoir 10 is connected to atmospheric pressure by the vent 11. A valve spring 6 forces a replenishing valve element 17 against its seat except during the intake or return stroke of piston 1. A pressure relief valve 8 is provided in the valve 7 which is forced by spring 9 against the overpressure valve bores 12. Reservoir 10 is connected to cylinder 2 by a bore 13.

FIG. 2 shows the arrangement of the control valve assembly. A check valve 21 is placed between the line 3 coming from the hydraulic pump and the lines 3a and 3b leading to left and right height adjusting devices of the type shown in FIG. 3. A shutoff valve 20 and a throttle valve 19 are installed parallel to the check valve 21 by T-connectors 22 and 23. The shutoff valve 20 is actuated by a valve arm 16 which is connected by spring 15 to the chassis 14 of the vehicle and by a pull cable 17 connected to axle 18 of the vehicle.

In FIG. 3 a standard telescopic shock absorber 24 has been equipped with a cylindrical sleeve 25 at the lower end of its cylinder. The piston rod of the shock absorber 24 is connected to a collar 26 which forms a spring seat and is secured by it to the chassis. A second spring seat or collar 28 supporting the other end of a coil spring 27 is mounted on the cylinder of shock absorber 24 in a sliding manner. A circular extension 30 of the second spring collar 28 forms a piston and together with cylindrical sleeve 25 defines a pressure chamber 31 which is sealed to the outside by a seal 32. Excessive upward movement of the piston 28 is prevented by a stop 33 on the shock absorber 24. The pressure chamber 31 can be charged with pressurized fluid by line 3a.

FIG. 4 shows another hydraulic pump which is actuated not manually by the driver as is the device of FIG. 1 but by the natural movements of the vehicle suspension elements.

A piston 1' moves in a cylinder 2' which is attached to the chassis of the motor vehicle. A compression spring 4' biases piston 1' into its lower starting position. A pipeline 3' connects the pressure chamber of cylinder 2' with the height adjustment device of FIG. 3. The pressure chamber of cylinder 2' is connected by bores and a replenishing valve 7' with a reservoir 10' which is at atmospheric pressure via a vent 11'. Oil is returned to the reservoir through line 5'.

OPERATION

At the normal level of the vehicle, the valve arm 16 of the shutoff valve 20 oscillates about the position A (see FIG. 2) and, in that position, the return of pressurized fluid from the equalizing elements is blocked. If the vehicle is loaded and if the chassis 18 drops to such an extent with respect to axle 18 that a level adjustment becomes necessary for reasons such as ride comfort or headlight adjustment, the spring 15 pulls valve arm 16 from the position A to position C, whereby a switch 34 is closed. Switch 34 actuates a signal light that notifies the driver of the need for a level adjustment. A delay relay must be placed between switch 34 and the signal light in order to avoid actuation of the signal light during ordinary spring deflection. The signal lamp should only light up when the contact is closed over an interval of several seconds.

The driver will operate the hydraulic pump according to FIG. 1 upon observing the signal and force pressurized fluid by lines 3, 3a and 3b into the pressure chambers of the height adjustment devices of FIG. 3 until the coil springs 27 are stressed by raising the spring seat 28 to such an extent that the normal level of the vehicle is again reached. The valve arm 16 will then be returned to oscillate in the central range A by the pull cable 17 and the signal lamp will be extinguished.

In the embodiment of the level adjustment system employing the automatic pump shown in FIG. 4, the switch 34 is no longer necessary because piston 1' of the pump automatically contacts the axle 18' with its elastic rubber buffer 35 when its deflection exceeds the amount "S" and thereafter the pump is operated upon each jounce movement of the axle 18' to supply pressurized fluid to the pressure chambers of the devices of FIG. 3. Once the standard level of the vehicle has been attained, due to the stress of the vehicle coil springs 27, the pump of FIG. 4 will automatically stops its delivery until such time as the axle 18 deflects through the distance "S."

If a loaded motor vehicle raised to its normal level is unloaded, the chassis 14 will then be spaced from the axle 18 by an undesirable excessive amount and the pull cable 17 will place valve arm 16 of the shutoff valve 20 into the position B. In this position, shutoff valve 20 opens and the return flow of pressurized fluid from the annular pressure chamber 31 passes through the throttle valve 19, lines 3 and 3' and return bores 5 and 5'. Chassis 14 thus drops slowly with respect to the axle 18 until valve arm 16 is again returned to the A position by spring 15 whereupon the shutoff valve 20 closes again.

The foregoing description presents the presently preferred embodiments of this invention. Alterations and modifications may occur to those skilled in the art that will come within its scope and spirit.

I claim:

1. A suspension unit for a ride height adjustment system for a motor vehicle comprising an extendible strut, said strut having first and second relatively movable parts, a first spring seat secured to said first part, a second spring seat slidably engaging said second part, a suspension spring interposed between said first and second spring seats, a member secured to said second part and forming a part of a pressure chamber, said second spring seat having a piston part fitted within said chamber, said chamber being constructed to receive a pressurized fluid to displace said piston part and impose a load upon said spring.

2. A suspension unit according to claim 1 and including:
   said strut comprising a telescopic hydraulic shock absorber, one of said first and second parts comprising a piston rod and the other of said parts comprising a cylindrical member.

3. A suspension unit for a ride height adjustment system for a motor vehicle comprises a shock absorber, said shock absorber having a cylinder part and a piston rod part, a first spring seat secured to said piston rod part, a second spring seat slidably engaging said cylinder part, a suspension spring interposed between said first and second spring seats, a member secured to said cylinder part and forming a part of a pressure chamber, said second spring seat having a piston part fitted within said chamber, said chamber being constructed to receive a pressurized fluid to displace said piston part and impose a load upon said spring.

4. A suspension unit according to claim 3 and including:
   the exterior surface of said cylinder part defining a portion of said chamber.

5. A suspension unit according to claim 3 and including:
   said spring comprising a coil spring concentrically disposed about said shock absorber.

6. A suspension unit according to claim 3 and including:
   a pressure source constructed to convey hydraulic fluid to said chamber.

7. A suspension unit according to claim 3 and including:
   the exterior surface of said cylinder part defining a portion of said chamber, said spring comprising a coil spring concentrically disposed about said shock absorber.

8. A suspension unit according to claim 3 and including:
   said member having an annular shape and having a portion spaced outwardly of said cylinder part, said piston part having an annular configuration and fitted within said annular portion of said member.

9. A suspension unit according to claim 3 and including:
   said spring comprising a coil spring concentrically disposed about said shock absorber, the exterior surface of said cylinder part defining a portion of said chamber, said member having an annular shape and having a portion spaced outwardly of said cylinder part, said piston part having an annular configuration and fitted within said annular portion of said member, a pressure source constructed to convey hydraulic fluid to said chamber.

10. A suspension unit for a ride height adjustment system for a motor vehicle comprising an extendible strut, said strut having first and second relatively movable parts, a first spring seat secured to said first part, a second spring seat movably disposed with respect to said second part, a suspension spring interposed between said first and second spring seats, an expansible pressure chamber comprising relatively movable first and second member, said first member being secured to said second part, said second spring seat being connected to said second member, said chamber being constructed to receive a pressurized fluid to cause the relative displacement of said members and impose a load upon said spring.

11. A suspension unit constructed to be interposed between sprung and unsprung vehicle components and to support said sprung component on said unsprung component comprising a first spring seat constructed to be secured to said sprung component, a second spring seat, a suspension spring interposed between said first and second spring seats, an expansible chamber device having a first member secured to said second spring seat, said device having a second member constructed to be connected to said unsprung component, said device being constructed to receive a pressurized fluid to cause the relative displacement of said members and thereby impose a force upon said spring and change the relative position of said sprung and unsprung components.

12. A suspension unit constructed to be interposed between sprung and unsprung vehicle components and to support said sprung component on said unsprung component comprising a first spring seat constructed to be secured to said sprung component, a second spring seat, a metallic suspension spring interposed between said first and second spring seats, an expansible chamber device having a first member secured to said second spring seat, said device having a second member constructed to be connected to said unsprung component, a hydraulic pressure source, said device being connected to said source and constructed to receive pressurized hydraulic fluid to cause the relative displacement of said members and thereby impose a force upon said spring and change the relative position of said sprung and unsprung components.

13. A suspension unit constructed to be interposed between sprung and unsprung vehicle components and to support said sprung component on said unsprung component comprising a first spring seat constructed to be secured to said sprung component, a second spring seat, a coil suspension spring operatively interposed between said first and second spring seats, and expansible chamber device having first and second members that are relatively displaceable along an axis substantially coaxial with said spring, said first member being secured to said second spring seat, said second member being constructed to be connected to said unsprung component, said device being constructed to receive a pressurized fluid to cause the relative displacement of said members and thereby impose a force upon said spring and change the relative position of said sprung and unsprung components.

* * * * *